US010469160B2

(12) United States Patent
Todeschini

(10) Patent No.: US 10,469,160 B2
(45) Date of Patent: Nov. 5, 2019

(54) SYSTEM FOR COMMUNICATION IN A DRONE SYSTEM

(71) Applicant: SAFRAN ELECTRONICS & DEFENSE, Boulogne Billancourt (FR)

(72) Inventor: Eric Todeschini, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/331,838

(22) PCT Filed: Sep. 25, 2017

(86) PCT No.: PCT/EP2017/074238
§ 371 (c)(1),
(2) Date: Mar. 8, 2019

(87) PCT Pub. No.: WO2018/055164
PCT Pub. Date: Mar. 29, 2018

(65) Prior Publication Data
US 2019/0253138 A1    Aug. 15, 2019

(30) Foreign Application Priority Data
Sep. 26, 2016   (FR) ..................................... 16 01400

(51) Int. Cl.
*H04B 7/26* (2006.01)
*H04L 5/00* (2006.01)
(Continued)

(52) U.S. Cl.
CPC ......... *H04B 7/2643* (2013.01); *B64C 39/024* (2013.01); *H04L 5/0044* (2013.01);
(Continued)

(58) Field of Classification Search
CPC ... H04B 7/2643; B64C 39/024; H04L 5/0044; H04L 5/0085; H04L 5/1469
(Continued)

(56) References Cited

U.S. PATENT DOCUMENTS 8,184,572 B1   5/2012   Kraus et al.
8,908,573 B1   12/2014  Wang et al.
(Continued)

OTHER PUBLICATIONS

Gu et al;. "C-ICAMA, A Centralized Intelligent Channel Assigned Multiple Access for Multi-Layer Ad-Hoc Wireless Networks with UAVs;" Computer Science Department, University of California, Los Angeles; pp. 879-884; 2000.
(Continued)

*Primary Examiner* — Michael R Neff
(74) *Attorney, Agent, or Firm* — Oliff PLC; R. Brian Drozd

(57) ABSTRACT

Communication system, used in a drone system, based on a communication system of the TDMA type in which the time is divided into a plurality of temporal breakdown hierarchy levels. All the hierarchy levels being suitable for complying with a plurality of constraints related to the drone system comprising a first constraint meaning that each communication between a drone and a station controlling the drone system must be compatible with a conversation audio data transmission, a second constraint meaning that the control station must be capable of controlling a predefined number of drones simultaneously and a third constraint meaning that, the drone system using transmissions by bursts, each burst must be transmitted over a stationary channel.

8 Claims, 4 Drawing Sheets

(51) Int. Cl.
*B64C 39/02* (2006.01)
*H04L 5/14* (2006.01)

(52) U.S. Cl.
CPC .......... *H04L 5/0085* (2013.01); *H04L 5/1469* (2013.01); *B64C 2201/127* (2013.01); *B64C 2201/146* (2013.01)

(58) Field of Classification Search
USPC ........................................................ 375/262
See application file for complete search history.

(56) References Cited

U.S. PATENT DOCUMENTS

| | | |
|---|---|---|
| 2013/0100942 A1 | 4/2013 | Rudnick et al. |
| 2014/0222248 A1 | 8/2014 | Levien et al. |
| 2018/0244386 A1* | 8/2018 | Phan ...................... B64C 39/024 |
| 2018/0327090 A1* | 11/2018 | De Chassey ........... A63H 27/12 |
| 2018/0336789 A1* | 11/2018 | Damnjanovic ......... H04W 8/24 |
| 2019/0100108 A1* | 4/2019 | Davis ..................... H02J 7/0042 |
| 2019/0127063 A1* | 5/2019 | Gozluklu ................ B64C 37/02 |

OTHER PUBLICATIONS

Dec. 8, 2017 International Search Report issued in International Patent Application No. PCT/EP2017/074238.

\* cited by examiner

SYSTEM FOR COMMUNICATION IN A DRONE SYSTEM

The invention relates to a communication system included in a pilotless mobile device system, comprising a control station and at least one pilotless mobile device.

The preservation of human beings has become a major preoccupation in many fields. Thus, in many perilous missions, human beings are replaced by pilotless mobile devices. Mention can be made for example of certain observation missions over dangerous zones such as conflict zones, construction sites at a height, or nuclear sites, performed by pilotless airborne devices referred to as drones, devices travelling on the ground, or floating or submersible devices.

Although some pilotless mobile devices are fully automatic, many of these devices are remotely controlled by one or more human beings from a control station. These pilotless mobile devices must generally transmit results of observations either to a person controlling them or to a person responsible for analysing data resulting from these observations. These data frequently comprise images and sometimes videos. It is then necessary to establish wireless communications between the pilotless mobile devices and the control station in order to provide remote control of said devices and transmission of the observation data. Such communications must be as reliable as possible firstly in order for a loss of control not to cause loss of the pilotless mobile device, which may have a very high cost, and secondly so that the observation data are as usable as possible.

A system composed of at least one base station and at least one pilotless mobile device, referred to as a pilotless mobile device system, has a certain number of constraints particular to this type of system. Mention can be made for example of the following constraints:

- providing reliable communications up to a predefined distance. A typical maximum distance is for example 200 km between the control station and a pilotless mobile device;
- using a suitable frequency band, for example the military frequency band [4.4 GHz; 4.9 GHz] or the civil band [5.031 GHz; 5.091 GHz];
- providing a reliable command and control link for each pilotless mobile device up to a predefined number of pilotless mobile devices (for example four pilotless mobile devices);
- providing an ATC (air traffic control) link between a user controlling the pilotless mobile device from the control station and an airborne controller via the pilotless mobile device with a predefined latency time (for example less than 200 ms in order to be compatible with an audio conversation signal);
- providing a transport of useful-data streams (i.e. radar traces, images, video stream).

For each type of data exchange, a rate may be fixed, for example:

- the control link must enable a rate of 11 kbits/s;
- the control link must enable a rate of 11 kbits/s;
- the ATC link must enable a rate of 3.6 kbits/s;
- the link transporting useful data streams must enable a rate of 9 to 256 kbits/s depending on the data exchanged and the direction of data exchange.

The pilotless mobile device system must therefore use a communication system suited to this type of constraint. This communication system is composed of a communication module on the control station side and a communication module in each pilotless mobile device.

It is therefore necessary to define a communication system suited to the particular context of the pilotless mobile device systems, taking into account the various constraints relating to this context.

According to one aspect of the present invention, the present invention relates to a communication system included in a pilotless mobile device system comprising a control station and at least one pilotless mobile device, enabling each pilotless mobile device to communicate with the control station using a medium-access technique of the time division multiple access type in which each communication takes place in frames. The communication system is such that: a frame duration is defined for each frame used in the communication system so as to obtain latency times in each communication between each pilotless mobile device and the base station that are compatible with a transmission of conversation audio data; each frame being divided into a plurality of timeslots comprising a first timeslot enabling the control station to transmit a first signal designating a pilotless mobile device and enabling each pilotless mobile device to synchronise on a time reference given by the control station, a second timeslot enabling the pilotless mobile device designated by the first signal to transmit a second signal enabling it thus to acknowledge its presence in the pilotless mobile device system, and a succession of timeslots comprising a number of timeslots dependent on a maximum number of pilotless mobile devices that can be controlled by the control station in the pilotless mobile device system, the timeslots in the succession of timeslots being used to exchange useful data between each pilotless mobile device and the control station; and each timeslot is divided into a plurality of burst intervals with a duration making it possible to obtain a stationary channel during said duration.

According to one embodiment, the control station comprises a plurality of sectoral antennas each covering a predefined sector in the vicinity of said plurality and the frames used in said system are organised in a succession of groups of consecutive frames, each group of frames being organised in a group structure associating each frame with a pair formed by an antenna of the control station and of a pilotless mobile device included in the pilotless mobile device system, each possible pair being associated with a different frame in the group of frames according to a position of said frame in said group, information representing the group structure being shared between the control station and each pilotless mobile device.

According to one embodiment, for each frame, information representing characteristics of the timeslots included in said frame is shared by the control station and each pilotless mobile device, this information comprising, for each timeslot, information representing burst interval numbers included in the timeslot, an identifier of a device from among the control station or each pilotless mobile device being able to transmit useful data during said timeslot and an identifier of a device from among the control station or each pilotless mobile device being able to receive useful data during said timeslot.

According to one embodiment, the information representing characteristics of timeslots included in said frame further comprises, for each timeslot, an identifier of a coding rate of an error correcting code applied to the useful data transmitted during said timeslot.

According to one embodiment, each burst interval is divided into a plurality of periods comprising a period used for transmitting a sequence of symbols enabling the control station or the pilotless mobile device receiving said sequence of symbols to make a channel estimation in order to carry out synchronisations of frequency, phase and timing and reception signal equalisations and/or a period making it possible to transmit data representing a burst interval number.

According to one embodiment, the control station and each pilotless mobile device comprise a transmission module comprising: a channel coding module comprising an LDPC coding module used for coding the useful data transmitted during a timeslot and a BCH coding module used for coding the data representing a burst interval number; a baseband filtering module of the Gaussian filter type; and a minimum-shift continuous-phase modulation module; and a reception module comprising: a baseband filtering module suitable for ensuring baseband selectivity; a module for demodulation of a minimum-shift continuous-phase modulation; a BCH decoding module; and an LDPC decoding module.

According to one embodiment, the transmission module further comprises a transmission security module using a frequency hopping technique, and the reception module further comprises a reciprocal transmission security module corresponding to the transmission security module; and the information representing characteristics of timeslots included in said frame further comprises, for each timeslot, an identifier of a frequency channel number used by the transmission security module.

According to one embodiment, the LDPC coding module is followed by a time interleaving module of the row/column type and the LDPC decoding module is preceded by a time deinterleaving module of the row/column type.

The features of the invention mentioned above, as well as others, will emerge more clearly from a reading of the following description of an example embodiment, said description being given in relation to the accompanying drawings, among which:

The invention is described hereinafter in a context of a pilotless mobile device system comprising a control station and one to four drones. The pilotless mobile device system is therefore referred to hereinafter as a drone system. The invention does however apply to other contexts. For example, the invention could just as well apply to other pilotless mobile devices such as devices travelling on the ground, or floating or submersible devices. Moreover, the invention could apply with a different number of drones.

Five main constraints are defined for the development of the drone system according to the invention:

the drone system must coexist with other drone systems in a network of drone systems. Each control station of a drone system has a range zone that can be seen as a communication cell. The communication system of the drone system must enable a drone to pass from one communication cell to another synchronously;

the communication system of the drone system must have latencies compatible with conversation audio signal communications;

since a transmission of useful data in the communication system takes place by bursts, the communication system must make it possible to transmit each burst over a stationary channel;

the communication system of the drone system must make it possible to control a drone up to a predefined distance (for example 200 km).

the communication system of the drone system must support up to four drones simultaneously.

The communication system of the drone system of the invention must make it possible to comply conjointly with at least these five constraints.

Figure 1:
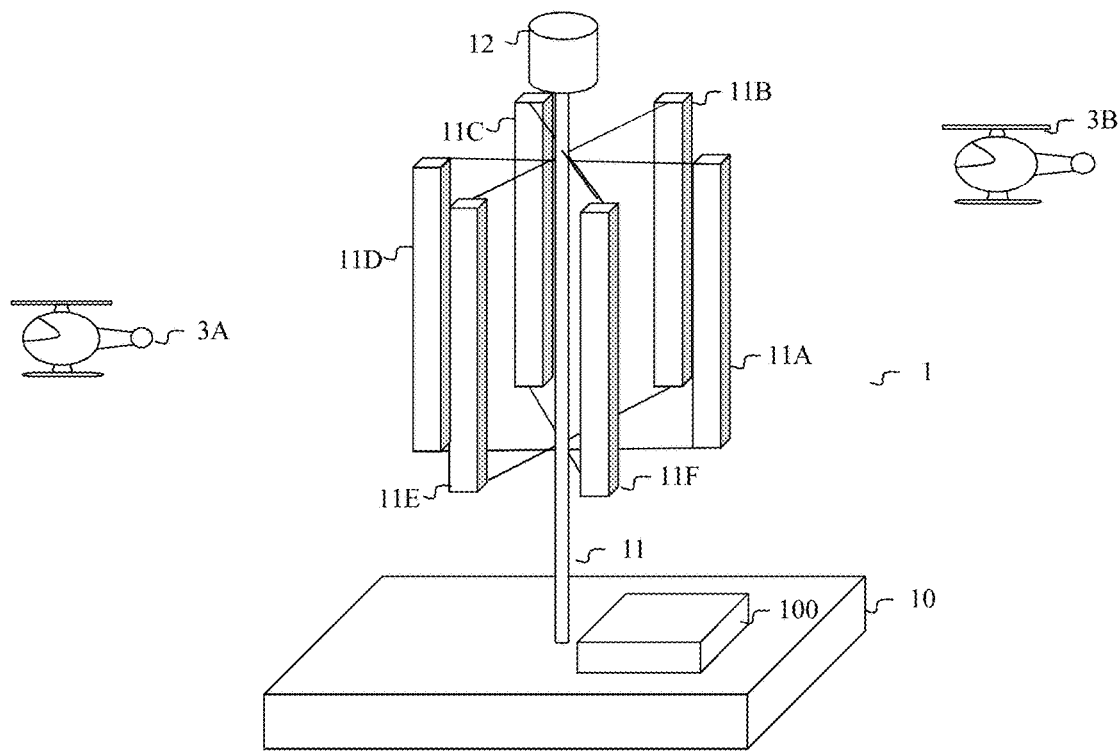
FIG. 1 illustrates schematically a pilotless mobile device system according to the invention.

FIG. 1 illustrates schematically an example of a drone system according to the invention.

In the example in FIG. 1, a drone system 1 comprises a control station 10 for simultaneously controlling drones 3A and 3B. This drone system is defined so as to be compatible with the five main constraints.

The control station 10 comprises an antenna system 11 comprising a plurality of antennas. The control station 10 comprises a processing module 100. The plurality of antennas comprises six sectoral antennas 11A, 11B, 11C, 11D, 11E and 11F and an omnidirectional antenna 12. Each sectoral antenna makes it possible to cover at −3 dB an azimuth of 60° and an elevation of +8°. The sectoral antennas each have a gain at +14 dBi. The omnidirectional antenna 12 makes it possible to cover at −3 dB an azimuth of 360° and from +8° to +90° in elevation with a gain ranging from +2.5 dBi to +6 dBi. The omnidirectional antenna 12 serves at a short distance for passages of drones above the antenna system 11 of the control station 10. It should be noted that, apart from the improvement in terms of gain obtained by means of the combination of an omnidirectional antenna with sectoral antennas compared with a solution based solely on omnidirectional antennas, a use of sectoral antennas makes it possible to be less sensitive to multipaths because of the directivity of the sectoral antennas. The features of this antenna system 11 help to enable the communication system of the drone system 1 to achieve the predefined distance fixed in the main constraints.

Each drone (3A or 3B) comprises an antenna system (not shown) comprising two omnidirectional antennas (not shown), an omnidirectional antenna for covering at −3 dB an azimuth of 360° and from 0° to +90° in elevation and an omnidirectional antenna for covering at −3 dB an azimuth of 360° and from 0° to −90° in elevation.

The drone system 1 described in relation to FIG. 1 forms a communication network in which the control station 10 communicates with the drones 3A and 3B. The control station 10 and the drones 3A and 3B exchange in particular command and control data in the direction from control station 10 to drone (3A or 3B) and useful data (for example observation data) in the direction from drone (3A or 3B) to control station 10. In the drone system 1, the control station 10 and the drones 3A and 3B use a medium-access technique of the time division multiple access (TDMA) type, which is referred to hereinafter as TDMA in order to simplify. TDMA divides the time into a plurality of hierarchical levels of time divisions, which we describe hereinafter in relation to FIG. 5. This medium-access technique requires time synchronisation at each node in the communication network (i.e. at the control station 10 and the drones 3A and 3B) in order to prevent any overlap in time. The communication network in FIG. 1 uses a centralised topology in which the control station 10 acts as a master node, that is to say the control station 10 times the whole of the network. The other nodes (i.e. the drones 3A and 3B) are slaves of the master node and adjust themselves timewise to a time reference given by the master node.

Figure 2:
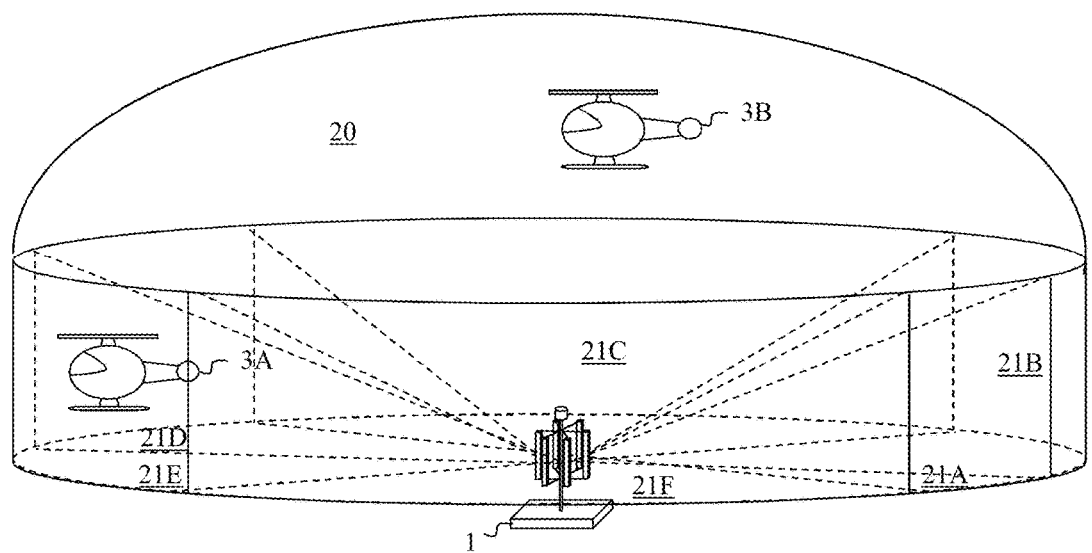
FIG. 2 illustrates schematically a range zone around an antenna system of a control station.

FIG. 2 illustrates schematically an example of a range zone around the antenna system 11 of the control station 10.

The range zone around the antenna system 11 can be seen schematically as a dome placed on a horizontal cylinder having the antenna system as its centre. This range zone comprises seven sectors. The six sectoral antennas 11A, 11B, 11C, 11D, 11E and 11F define respectively six sectors 21A, 21B, 21C, 21D, 21E and 21F. Each of the six sectors 21A, 21B, 21C, 21D, 21E and 21F has a semipyramidal form of azimuth 60° and +8° of elevation. All the pyramidal forms share the same vertex situated at the antenna system 11. The sectors 21A, 21B, 21C, 21D, 21E and 21F form a combined sector of 360° of azimuth and +8° of elevation fitting in the horizontal cylinder. The remaining part of the whole formed by the dome and the cylinder is the sector 20 covered by the omnidirectional antenna 12.

In the example in FIG. 2, the drone 3A is situated in the sector 21D covered by the antenna 11D and the drone 3B is situated in the sector 20 covered by the antenna 12. It will therefore be realised that, according to the position of a drone in the range zone of the antenna system 11, each antenna does not offer the same communication capability with said drone.

It should be noted that FIG. 2 shows a theoretical view of a division of a range zone into sectors and that in reality the range zone of an antenna is a transmission lobe having a non-zero intersection with transmission lobes of other antennas in the vicinity thereof.

Figure 3:
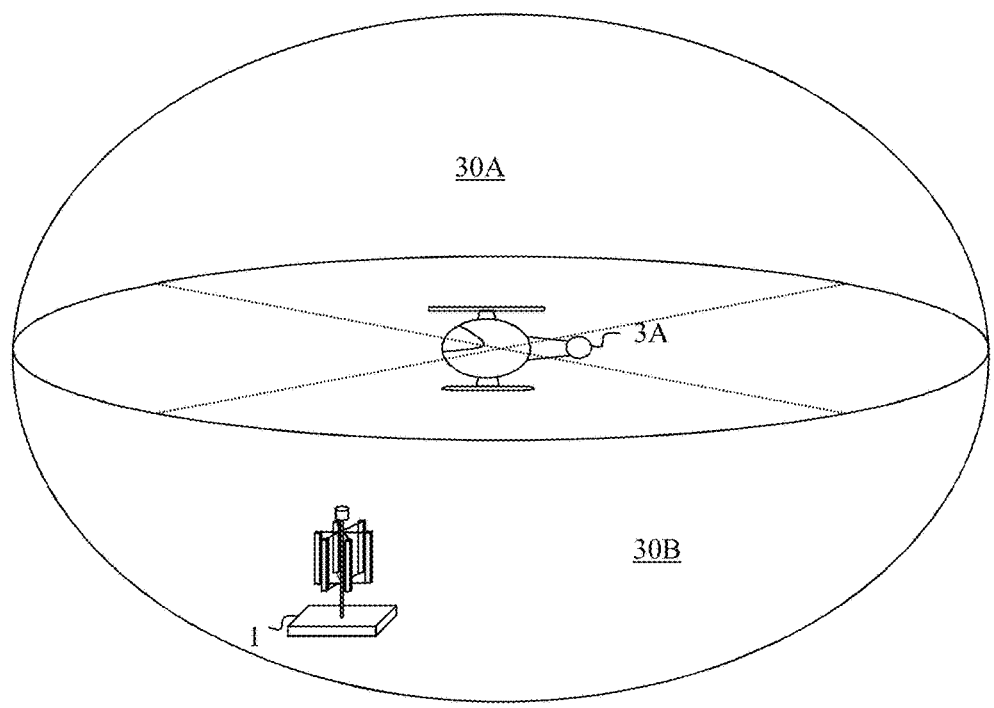
FIG. 3 illustrates schematically a range zone around an antenna system of a drone.

FIG. 3 illustrates schematically a range zone around an antenna system of a drone.

The range zone around the antenna system of a drone can be represented by a sphere. The omnidirectional antennas of the antenna system of each drone divide said sphere into two semihemispherical sectors (i.e. two hemispheres) 30A and 30B separated by a horizontal plane. In the example in FIG. 3, the antenna system 11 of the control station 10 is situated in the sector 3B.

In the drone system 1, a single antenna in the antenna system 11 and a single antenna of a drone transmit or receive at the same time. The procedure for selecting the antenna in the antenna system 11 is implemented periodically by the processing module 100 in order to determine which antenna offers the best quality of communication between the control station 10 and the drone 3A (or respectively the drone 3B) at a given instant. Likewise, a procedure for selecting a drone antenna is implemented periodically by a processing module 300 included in each drone (3A or 3B) in order to determine which antenna offers the best quality of communication between the control station 10 and said drone at a given instant.

Figure 4A:
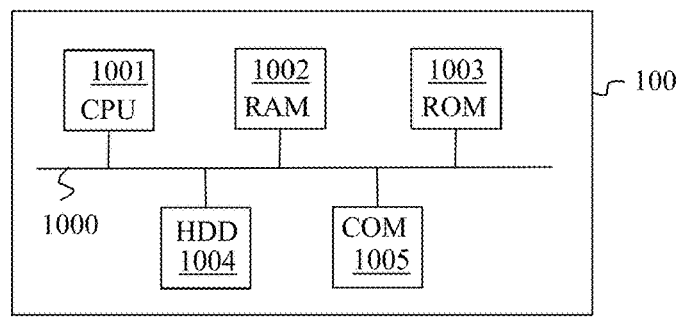
FIG. 4A illustrates schematically a processing module included in a control station.

FIG. 4A illustrates schematically an example of hardware architecture of the processing module 100 included in the control station 10.

According to the example of hardware architecture shown in FIG. 4A, the processing module 100 then comprises, connected by a communication bus 1000: a processor or CPU (central processing unit) 1001; a random access memory (RAM) 1002; a read only memory (ROM) 1003; a storage unit such as a hard disk or a storage medium reader, such as an SD (secure digital) card reader 1004; at least one communication interface 1005 enabling the processing module 100 to communicate with other modules or devices. For example, the communication interface 1005 enables the processing module 100 to communicate with other modules of the control station 10 such as an antenna-switching module for selecting an antenna to be used at a given instant or with other devices such as the drones 3A and 3B.

The processor 1001 is capable of executing instructions loaded in the RAM 1002 from the ROM 1003, from an external memory (not shown), from a storage medium (such as an SD card) or from a communication network. When the control module 10 is powered up, the processor 1001 is capable of reading instructions from the RAM 1002 and executing them. In one embodiment, these instructions form a computer program causing the implementation of communications between the base station 10 and each drone in the drone system 1 and a procedure for selecting an antenna of the antenna system 11 in order to communicate with each drone in the drone system 1 at a given instant.

Figure 4B:
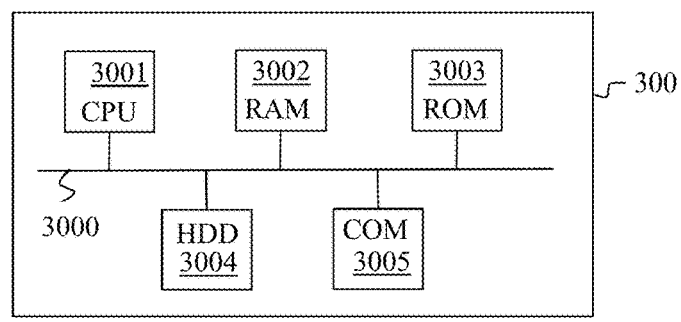
FIG. 4B illustrates schematically a processing module included in a drone.

FIG. 4B illustrates schematically an example of hardware architecture of a processing module 300 included in a drone such as the drone 3A or the drone 3B.

According to the example of hardware architecture shown in FIG. 4B, the processing module 300 then comprises, connected by a communication bus 3000: a processor or CPU (central processing unit) 3001; a random access memory (RAM) 3002; a read-only memory (ROM) 3003; a storage unit such as a hard disk or a storage medium reader, such as an SD (secure digital) card reader 3004; at least one communication interface 3005 enabling the processing module 300 to communicate with other modules or devices. For example, the communication interface 3005 enables the processing module 300 to communicate with other modules such as an antenna-switching module for selecting an antenna to be used at a given instant or with the control station 10.

The processor 3001 is capable of executing instructions loaded in the RAM 3002 from the ROM 3003, from an external memory (not shown), from a storage medium (such as an SD card) or from a communication network. When a drone (3A or 3B) is powered up, the processor 3001 is capable of reading instructions from the RAM 3002 and executing them. In one embodiment, these instructions form a computer program causing the implementation of communications between the drone comprising the control module 300 and the control station 10.

The methods implemented by the processing module 100 and the processing module 300 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 6:
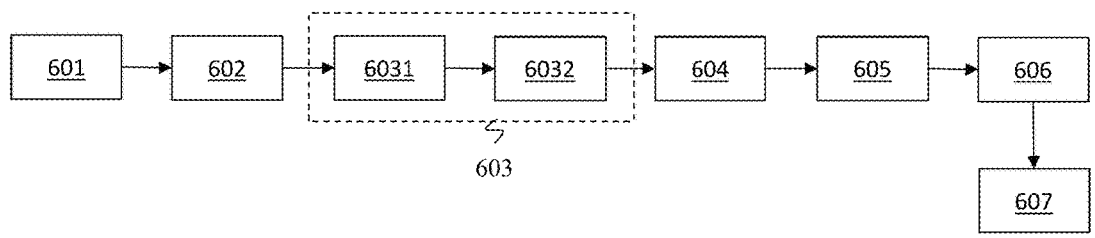
FIG. 6 illustrates schematically a transmission module according to the invention.

FIG. 6 illustrates schematically a transmission module according to the invention.

The communication interface 1005 of the control station 10 and the communication interface 3005 of each drone 3A and 3B each comprise a transmission module identical to the transmission module described in relation to FIG. 6.

The transmission module comprises:
a multiplexing module 601;
a module for forming data blocks (referred to as "bursts") 602;
a channel coding module 603 comprising an LDPC (low density parity check) coding module 6031 and a BCH (Bose, Ray-Chaudhuri and Hocquenghem) coding module 6032;
a baseband filtering module 604 such as a Gaussian filter;
an MSK (minimum shift keying) modulation module 605. The combination of the filtering module using a Gaussian filter and the MSK modulation module creates a GMSK (Gaussian minimum shift keying) modulation module;
a radio-frequency module 606 comprising a module for transposing from the baseband to the military frequency band [4.4 GHz; 4.9 GHz] or the civil band [5.031 GHz; 5.091 GHz], a high power amplification (HPA) module, a transmission filter and a switch allowing selection between the transmission module and a reception module.
an antenna system 607 corresponding to the antenna system 11 for the control station 10 or to the antenna system of the drone for the drone 3A and the drone 3B.

The modulation chosen (i.e. GMSK modulation) makes it possible to carry out channel coding of the convolutional type because of a memory effect introduced by the Gaussian filter. GMSK modulation is particularly suitable for achieving the bit rates required on each channel provided in the frequency band used (i.e. the military frequency band [4.4 GHz; 4.9 GHz] or the civil band [5.031 GHz; 5.091 GHz]).

As described above, the channel coding module 603 comprises two submodules: an LDPC coding module 6031 and a BCH coding module 6032.

In one embodiment, the LDPC coding module 6031 may be followed by a time interleaving module of the row/column type. The interleaving takes place on the useful data included in each temporal burst interval of a timeslot.

In one embodiment, the transmission module comprises a transmission security (TRANSEC) module using for example a frequency hopping technique (frequency hopping spread spectrum (FHSS)).

Figure 7:
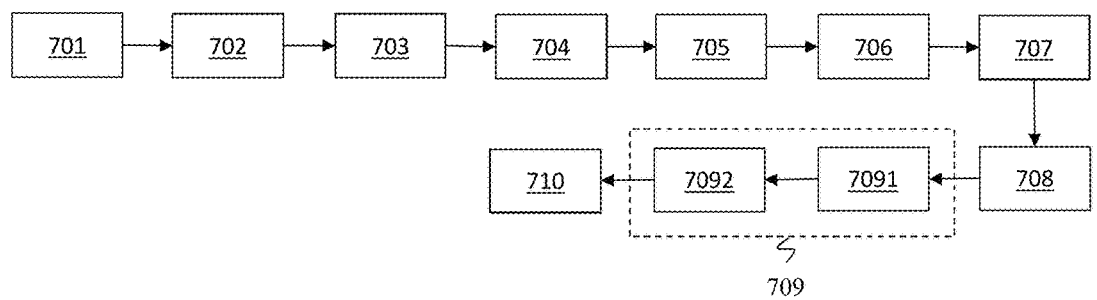
FIG. 7 illustrates schematically a reception module according to the invention.

FIG. 7 illustrates schematically a reception module. The communication interface 1005 of the control station 10 and the communication interface 3005 of each drone 3A and 3B each comprise a reception module identical to the reception module described in relation to FIG. 7.

The reception module comprises:
an antenna system 701 corresponding to the antenna system 11 for the control station 10 or to the antenna system of the drone for the drone 3A and the drone 3B. It should be noted that, for the control station 10 and each drone, the antenna systems 607 and 701 are in reality a single transmission and reception antenna system;
a reception filter 702 for selecting a frequency band. This reception filter makes it possible for example to select the military frequency band [4.4 GHz; 4.9 GHz] or the civil band [5.031 GHz; 5.091 GHz];
a low-noise amplifier (LNA) 703;
a module 704 for frequency transposition from the military frequency band [4.4 GHz; 4.9 GHz] or the civil band [5.031 GHz; 5.091 GHz] to the baseband;
a baseband filtering module 705 providing baseband selectivity;
a baseband signal equalisation module 706 making it possible to be partly free from multipath phenomena;
a frequency and phase synchronisation module 707;
a GMSK demodulation module 708;
a BCH decoding module 7091;
an LDPC decoding module 7092;
a module for demultiplexing the data streams 710.

It should be noted that when, in the transmission module, the LDPC coding module 6031 is followed by a time interleaving module of the row/column type, the LDPC decoding module 7092 is preceded by a time deinterleaving module of the row/column type.

Moreover, when the transmission module comprises a transmission security module (TRANSEC), the reception module comprises a reciprocal transmission security module.

Figure 5:
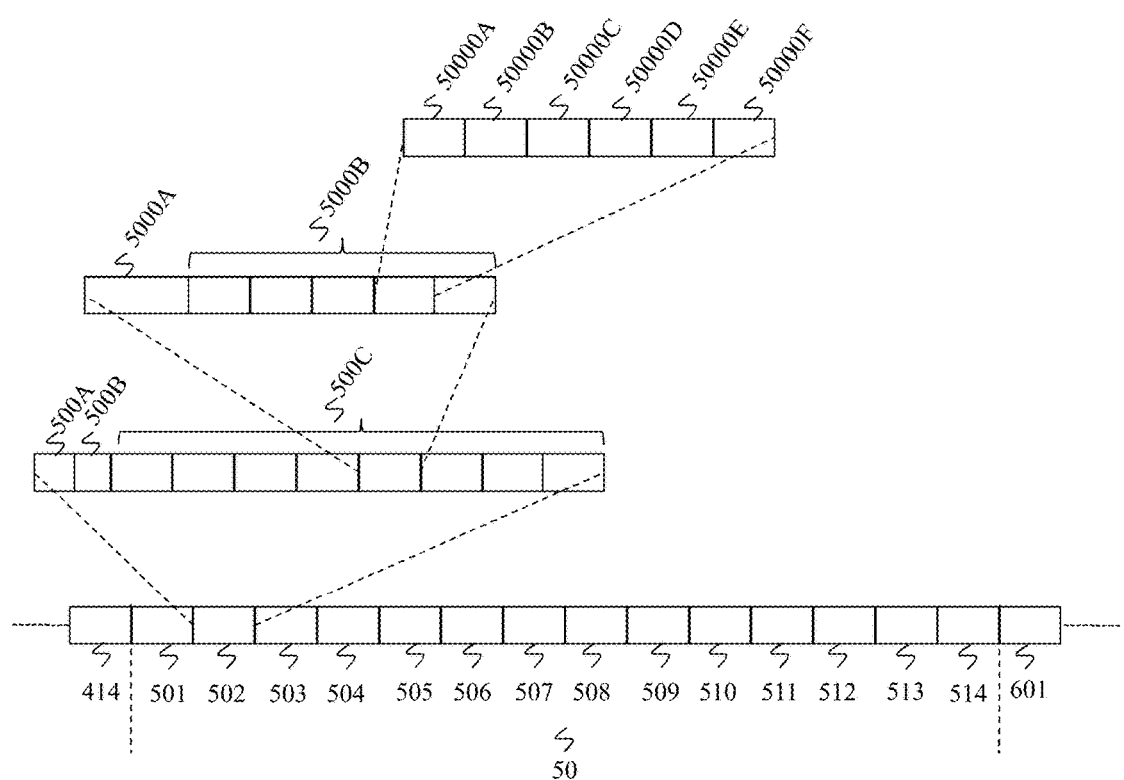
FIG. 5 illustrates schematically a medium-access technique according to the invention, of the time division multiple access type dividing the time into a plurality of hierarchical levels of time divisions.

FIG. 5 illustrates schematically a medium access technique according to the invention, of the time division multiple access type dividing the time into a plurality of hierarchical time division levels.

TDMA divides the time into a first hierarchical level referred to as an epoch (not shown in FIG. 5) for example with a duration of one second. One advantage of using an epoch with a duration of one second is, in the case of the use of a universal time reference delivered for example by a GPS (global positioning system) signal, is allowing change from one communication cell to another synchronously. The communication system of the drone system 1 therefore makes it possible to comply with a second main constraint.

In the example of the drone system 1, an epoch is divided into five frames, for example with a duration of 200 ms. A frame duration of 200 ms makes it possible to have a latency time in a communication between a drone and the control station compatible with a transmission of conversation audio data. Thus the communication system of the drone system 1 complies with a third main constraint.

In addition to being organised in epochs, the frames used in the drone system 1 are organised in a succession of groups of consecutive frames. A group of frames 50 is shown in FIG. 5. The group of frames 50 comprises a number of frames equal to the number of antennas of the antenna system 11 of the control station (i.e. seven) multiplied by the number of drones in activity in the drone system 1 (i.e. two drones). There are therefore as many frames in a group of frames as there are possible pairs formed by an antenna of the antenna system 11 and a drone. The group of frames 50 therefore comprises fourteen frames 501 to 514. A frame 414 belongs to a group of fourteen frames preceding the group of frames 50 and a frame 601 belonging to a group of fourteen frames following the group of frames 50. We shall see hereinafter that the organisation in groups of frames makes it possible to define in the drone system 1 which antenna of the antenna system 11 must transmit a signal to a given drone and thus to implement a procedure of selection of the antenna offering the best transmission quality between the control station 10 and said drone.

FIG. 5 gives a detail of the frame 502 included in the group of frames 50, all the frames used in the drone system 1 having an identical frame structure. The frame 502 is divided into a plurality of timeslots. The plurality of timeslots comprises a first timeslot 500A enabling the control station 10 to transmit a first signal known as a beacon enabling each zone to synchronise itself on a time reference given by the control station 10. It is by means of this beacon that the drones in the drone system 1 can synchronise themselves with the control station 10. Moreover, as we shall see hereinafter, the position of the frame in the group of frames indicates for which drone the beacon is intended.

It is therefore considered that the first signal designates a drone among the drones of the drone system 1.

The plurality of timeslots also comprises a second timeslot 500B enabling the drone designated by the first signal to transmit a second signal thus enabling it to acknowledge its presence in the drone system 1.

The timeslots 500A and 500B are followed by a succession of timeslots 500C. The succession of timeslots 500C comprises a number of timeslots dependent on the maximum number of drones that can be controlled in the drone system 1 (i.e. four drones). In the TDMA used in the drone system 1, each drone potentially able to be controlled is associated with two consecutive timeslots in the succession of timeslots: a timeslot during which the drone can receive data coming from the control station 10 and a timeslot during which the drone can send it in the direction of the control station 10. Each drone and the control station 10 share information describing an allocation of the timeslots 500A, 500B and of the succession of timeslots 500C in a frame. In the example described in relation to FIG. 5, the succession of timeslots comprises eight timeslots. The communication system of the drone system 1 can therefore manage up to four drones simultaneously. Thus the communication system of the drone system 1 complies with a fourth main constraint.

The information describing the allocation takes the form of an allocation table shared by all the nodes in the network.

communicating from the control station 10 to the drone 3B and a fourth timeslot used for communicating from the drone 3B to the control station 10. The last four timeslots are left free, for example for any two other drones.

Each timeslot has for example a duration of 20 ms corresponding to a division of a frame into ten timeslots. A timeslot of 20 ms makes it possible to contain a complete LDPC block, which makes it possible to limit transmission latencies of each of the nodes.

FIG. 5 also gives a detail of a timeslot of the frame 502, each timeslot of a frame having an identical structure. A timeslot of a frame comprises a burst interval 5000A making it possible to take into account propagation times in the drone system 1, and a set of burst intervals 5000B. The propagation time for reaching one of the drones 3A or 3B from the control station 10 at a typical maximum distance of 200 km for radio signals used in the military frequency band [4.4 GHz; 4.9 GHz] or civil band [5.031 GHz; 5.091 GHz] is around 0.8 ms. In the drone system 1, each timeslot comprises a set of five burst intervals 5000B. Consequently each burst interval has a duration of 3.84 ms. A burst interval duration of 3.84 ms makes it possible to obtain a channel considered to be stationary for the duration of a burst interval. In this way, the communication system of the drone system 1 complies with a fifth main constraint.

In one embodiment, the allocation table describes the structure of the timeslots in burst intervals.

TABLE 1

| | Timeslot number | | | | | | | | | | | | | | | | | | | | | | | | |
|---|---|---|---|---|---|---|---|---|---|---|---|---|---|---|---|---|---|---|---|---|---|---|---|---|---|
| | 1 | | | | | 2 | | | | | 3 | | | | | 4 | | | | | 5 | | | | |
| Burst interval number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Transmitter node | | | 000 | | | | | 000 | | | | | 000 | | | | | 001 | | | | | 000 | | |
| Receiver node | | | 001 | | | | | 001 | | | | | 001 | | | | | 000 | | | | | 010 | | |
| Coding ratio | | | 00 | | | | | 01 | | | | | 10 | | | | | 11 | | | | | 10 | | |
| Frequency channel number | | | 00000001 | | | | | 00000010 | | | | | 00000011 | | | | | 00000100 | | | | | 00000101 | | |

| | Timeslot number | | | | | | | | | |
|---|---|---|---|---|---|---|---|---|---|---|
| | 6 | | | | 7 | | 8 | | 9 | 10 |
| Burst interval number | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
| Transmitter node | | | 010 | | | | | 000 | | | | | 000 | | | | | 000 | | | | | 000 | | |
| Receiver node | | | 000 | | | | | 000 | | | | | 000 | | | | | 000 | | | | | 000 | | |
| Coding ratio | | | 11 | | | | | 00 | | | | | 00 | | | | | 00 | | | | | 00 | | |
| Frequency channel number | | | 00000110 | | | | | 00000000 | | | | | 00000000 | | | | | 00000000 | | | | | 00000000 | | |

This allocation table may be fixed or be updated synchronously in all the nodes in the network in order for example to take into account stoppages of drones or arrivals of new drones in the drone system 1.

At least one allocation table is transmitted during each frame in the timeslot 500A. Thus each node receiving an allocation table during a frame knows the allocation of the timeslots in said frame. Using this allocation table each drone knows in which timeslot of the frame it must transmit to the control station 10 and in which timeslot of the frame it can receive data from the control station 10. Likewise, the control station 10 knows in which timeslot it can send data to a given drone and in which timeslot of a frame it can receive data from a given drone. For example, in FIG. 5, the succession of timeslots 500C comprises a first timeslot used for communicating from the control station 10 to the drone 3A, a second timeslot used for communicating from the drone 3A to the control station 10, a third timeslot used for The table TAB 1 shows a table of allocation of the timeslots of a frame. This allocation table describes, for each timeslot of a frame, identified by a timeslot number, the numbers of the burst intervals included in this timeslot, an identifier of a transmitting node able to transmit during this timeslot, an identifier of a receiving node able to receive during this timeslot, and an identifier of a channel coding ratio. The identifiers "000", "001" and "010" are for example respectively the identifiers of the control station 10, of the drone 3A and of the drone 3B. The identifiers "00", "01", "10" and "11" are for example respectively coding ratio identifiers "0", "1/3", "1/4" and "2.3" for the LDPC coder 6031. When all the identifiers associated with a burst interval are at "0", each node in the network can deduce that this burst interval is not allocated.

In the embodiment in which the transmission module and the reception module comprise a transmission security (TRANSEC) module using a frequency hopping technique, each timeslot is associated with a frequency channel number identifier that can be used by the transmission security module. Each frequency channel identifier makes it possible to identify one of the channels available in the military frequency band [4.4 GHz; 4.9 GHz] or the civil band [5.031 GHz; 5.091 GHz]. Each burst transmitted during a burst interval can thus be transmitted using a different frequency. Division of a timeslot into five burst intervals makes it possible to obtain 250 frequency hops per second.

FIG. 5 moreover gives a detail of a burst interval of a timeslot of a frame, each burst interval having an identical structure. Each burst interval comprises a period 50000A referred to as a burst guard time, a period 50000B referred to as high-power amplifier (HPA) ramping and a period 50000F referred to as high-power amplifier (HPA) ramping off intended to take into account reaction times of electronic components of a drone 3A or 3B or of the control station 10. A period 50000C (referred to as a sequence preamble) is used for transmitting a sequence of symbols enabling the receiving node to make an estimation of the channel in order to perform frequency, phase and timing synchronisations and reception signal equalisations. These synchronisations make it possible to synchronise readings of samples following the period 50000C in the burst interval. A period 50000D (referred to as selection mode) makes it possible to transmit information representing a burst interval number in order to ensure time synchronisation of each of the drones on the control station. Moreover, this burst interval number enables each of the nodes to determine whether said burst interval is relevant to it for sending or receiving data. The data representing the burst interval number that are transmitted during the period 50000D are encoded by the BCH coding module 6032 independently of all other data of the burst interval. A period 50000E (referred to as a burst) makes it possible to transmit useful data. The useful data transmitted during the period 50000E are encoded by the LDPC coding module 6031. The independent encoding of the data corresponding to the burst interval number makes it possible to decode these data without having to decode the useful data. In this way, on reception, a processing module (100 or 300) is capable of determining whether useful data transmitted in a burst are intended for it or not, without having to decode said useful data.

The period 50000A is of a duration enabling in particular a burst interval detector to distinguish the burst intervals from each other. The periods 50000B and 50000F are dependent on the high-power amplifiers used. The period 50000D is dependent on a number of symbols necessary for encoding the subperiod number. The period 50000E is dependent on a duration during which the transmission channel remains almost stationary.

As seen above, each group of frames used in the drum system 1 is organised in a group structure associating each frame with a pair formed by an antenna of the control station 10 and of a drone, each possible pair being associated with a different frame according to the position of said frame in the group. For example, in FIG. 5, the frames 501 to 507 are associated with the drone 3A and the frames 508 to 514 are associated with the drone 3B. The frame 501 is associated with the antenna 11A, the frame 502 is associated with the antenna 11B, the frame 503 is associated with the antenna 11C, the frame 504 is associated with the antenna 11D, the frame 505 is associated with the antenna 11E, the frame 506 is associated with the antenna 11F and the frame 507 is associated with the antenna 12. The frame 508 is associated with the antenna 11A, the frame 509 is associated with the antenna 11B, the frame 510 is associated with the antenna 11C, the frame 511 is associated with the antenna 11D, the frame 512 is associated with the antenna 11E, the frame 513 is associated with the antenna 11F, and the frame 514 is associated with the antenna 12.

Each node, knowing the duration of each frame and being synchronised with the control station 10, is capable of determining when a frame begins, even when it does not receive data for some frames. Moreover, from the information contained in each allocation table, each node is capable of determining the group structure. This is because, from the number of intervals attributed in a frame, each node is capable of determining the number of drones active in the drone system 1. Since each drone knows the number of antennas in the antenna system 11, it is capable of determining the number of frames in a group of frames. In one embodiment, each node knows a group structure for each number of active drones possible in the drone system 1 (i.e. from 1 to 4 active drones). Moreover, in one embodiment, information representing a position of a frame in a group of frames is transmitted in the timeslot 500A of each frame. Thus, from the position of a current frame in a group of frames, each node is capable of determining which antenna in the control station 10 is transmitting a beacon and for which drone said beacon is intended. This information on the group structure among other things enables the processing module 100 of the control station 10 to implement an antenna selection method, enabling it to select, from the antennas in the antenna system 11, the antenna offering the best quality of communication with a given drone. This is because, taking the example in FIG. 5, for each beacon transmitted in the frames 501 to 507, the processing module 100 receives an acknowledgement signal from the drone 3A containing information representing a quality of reception of the beacon measured by the drone. Information representing a quality of reception is for example an RSSI (received signal strength indication) measurement measured when a beacon is received. From the information representing a quality of reception obtained, the processing module 100 determines which antenna is offering the best quality of communication and selects this antenna for a predetermined number of frames following the frame 507. For example, the processing module 100 selects an antenna for the drone 3A until the transmission of the next frame containing a beacon designating the drone 3A. In the example in FIG. 1 with two drones in the drone system 1, this amounts to selecting an antenna during seven frames. The processing module 100 does likewise for the drone 3B from the frames 508 to 517 in order to select the best antenna for communicating with the drone 3B.

The invention claimed is:

1. A communication system included in a pilotless mobile device system comprising a control station and at least one pilotless mobile device, enabling each pilotless mobile device to communicate with the control station using a medium-access technique of the time division multiple access type in which each communication takes place in frames, wherein:

a frame duration is defined for each frame used in the communication system so as to obtain latency times in each communication between each pilotless mobile device and the base station that are compatible with a transmission of conversation audio data;

each frame being divided into a plurality of timeslots comprising a first timeslot enabling the control station to transmit a first signal designating a pilotless mobile device and enabling each pilotless mobile device to synchronise on a time reference given by the control station, a second timeslot enabling the pilotless mobile device designated by the first signal to transmit a second signal enabling it thus to acknowledge its presence in the pilotless mobile device system, and a succession of timeslots comprising a number of timeslots dependent on a maximum number of pilotless mobile devices that can be controlled by the control station in the pilotless mobile device system, the timeslots in the succession of timeslots being used to exchange useful data between each pilotless mobile device and the control station; and each timeslot is divided into a plurality of burst intervals with a duration making it possible to obtain a stationary channel during said duration.

2. The communication system according to claim 1, wherein the control station comprises a plurality of sectoral antennas each covering a predefined sector in the vicinity of said plurality and in that the frames used in said system are organised in a succession of groups of consecutive frames, each group of frames being organised in a group structure associating each frame with a pair formed by an antenna of the control station and of a pilotless mobile device included in the pilotless mobile device system, each possible pair being associated with a different frame in the group of frames according to a position of said frame in said group, information representing the group structure being shared between the control station and each pilotless mobile device.

3. The communication system according to claim 2, wherein, for each frame, information representing characteristics of the timeslots included in said frame is shared by the control station and each pilotless mobile device, this information comprising, for each timeslot, information representing burst interval numbers included in the timeslot, an identifier of a device from among the control station or each pilotless mobile device being able to transmit useful data during said timeslot and an identifier of a device from among the control station or each pilotless mobile device being able to receive useful data during said timeslot.

4. The communication system according to claim 2, wherein the information representing characteristics of timeslots included in said frame further comprises, for each timeslot, an identifier of a coding rate of an error correcting code applied to the useful data transmitted during said timeslot.

5. The communication system according to claim 1, wherein each burst interval is divided into a plurality of periods comprising a period used for transmitting a sequence of symbols enabling the control station or the pilotless mobile device receiving said sequence of symbols to make a channel estimation in order to carry out synchronisations of frequency, phase and timing and reception signal equalisations and/or a period making it possible to transmit data representing a burst interval number.

6. The communication system according to claim 1, wherein the control station and each pilotless mobile device comprise a transmission module comprising:
    a channel coding module comprising an LDPC (low density parity check) coding module used for coding the useful data transmitted during a timeslot and a BCH (Bose, Ray-Chaudhuri and Hocquenghem) coding module used for coding the data representing a burst interval number;
    a baseband filtering module of the Gaussian filter type; and
    a minimum-shift continuous-phase modulation module; and
    a reception module comprising:
    a baseband filtering module suitable for ensuring baseband selectivity;
    a module for demodulation of a minimum-shift continuous-phase modulation;
    a BCH decoding module; and
    an LDPC decoding module.

7. The communication system according to claim 2, wherein the transmission module further comprises a transmission security module using a frequency hopping technique, and the reception module further comprises a reciprocal transmission security module corresponding to the transmission security module; and
    the information representing characteristics of timeslots included in said frame further comprises, for each timeslot, an identifier of a frequency channel number used by the transmission security module.

8. The communication system according to claim 6, wherein the LDPC coding module is followed by a time interleaving module of the row/column type and the LDPC decoding module is preceded by a time deinterleaving module of the row/column type.

* * * * *